United States Patent
Cronin et al.

[11] 3,814,830
[45] June 4, 1974

[54] LOW DIELECTRIC STRESS TERMINATION FOR GAS-INSULATED TRANSMISSION SYSTEM

[75] Inventors: John C. Cronin; David S. Dodge, both of Greensburg, Pa.

[73] Assignee: I-T-E Imperial Corporation, Spring House, Pa.

[22] Filed: Feb. 5, 1973

[21] Appl. No.: 329,433

[52] U.S. Cl. ............... 174/22 C, 174/10, 174/16 B, 174/28, 174/99 B
[51] Int. Cl. ............................................. H01b 9/06
[58] Field of Search ........ 174/22 C, 21 C, 20, 16 B, 174/99 B, 71 C, 88 B, 88 C, 28, 29, 10

[56] References Cited
UNITED STATES PATENTS

| | | | |
|---|---|---|---|
| 3,546,356 | 12/1970 | Graybill | 174/28 X |
| 3,548,071 | 12/1970 | Bahen, Jr. et al. | 174/88 B X |
| 3,573,342 | 4/1971 | Graybill | 174/22 C |
| 3,610,807 | 10/1971 | Whitehead | 174/21 C X |
| 3,688,015 | 8/1972 | Graybill | 174/28 X |

FOREIGN PATENTS OR APPLICATIONS

| 879,562 | 6/1953 | Germany | 174/22 C |
|---|---|---|---|

*Primary Examiner*—A. T. Grimley
*Attorney, Agent, or Firm*—Ostrolenk, Gerb & Soffen

[57] ABSTRACT

Gas-insulated bus sections are factory assembled and pressurized and are provided with sealed large diameter end sections which form enlarged volume connection regions for connecting adjacent sections. The enlarged diameter connection regions of adjacent sections are connected in the field and filled with dielectric gas.

7 Claims, 5 Drawing Figures

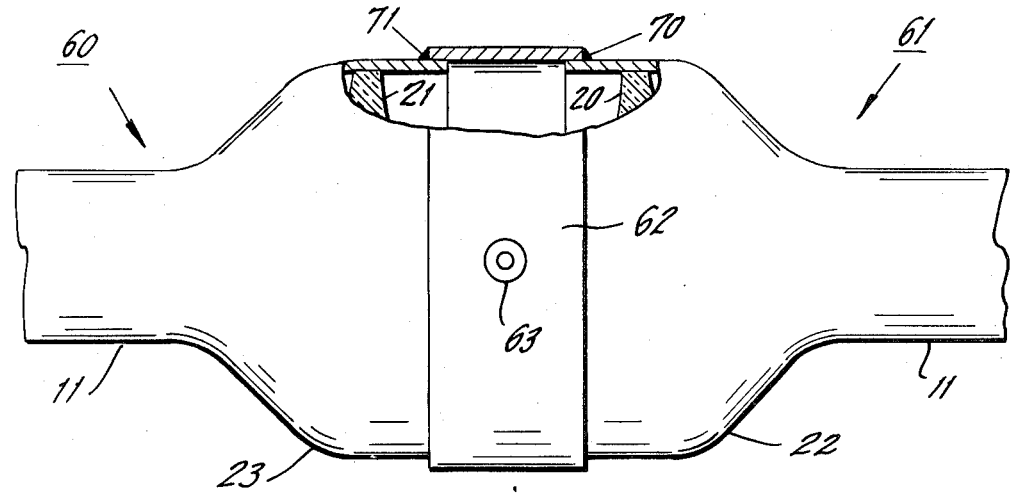
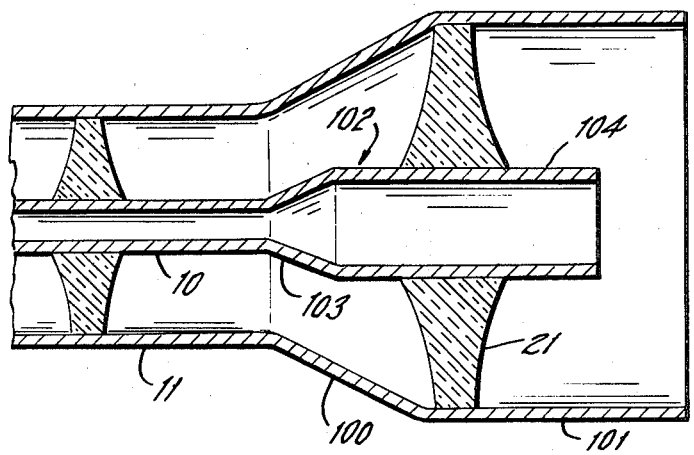

LOW DIELECTRIC STRESS TERMINATION FOR GAS-INSULATED TRANSMISSION SYSTEM

INTRODUCTION TO THE INVENTION

This invention relates to gas-insulated bus systems, and more specifically relates to a novel bus section construction to allow easy and reliable assembly of bus section in the field, which minimizes the danger of introducing contamination particles during the connection process.

Gas-insulated transmission systems are now commonly used for the transmission of electric power at extremely high voltages, for example, voltages in excess of 230 KV. These systems generally consist of a central main current carrying bus for each phase, where the bus is coaxially supported within a conductive metal enclosure by spaced insulation disks. The enclosure is then filled with a gas having good dielectric properties, typically sulfur hexafluoride, or gas mixtures which include sulfur hexafluoride, at relatively high pressures. Conventionally, these conductors are manufactured and shipped in 40 foot long sections, with the sections welded together in the field and then charged with the desired dielectric gas under pressure.

One of the most serious problems in the assembly of bus in the field is the danger of introducing contamination particles, particularly conducting particles, into the enclosure during the assembly and welding of the bus ends and the surrounding housing ends of adjacent sections. It is well known that these particles can be sources of breakdown between the central conductor and its grounded outer housing in the bus.

We have found that, at small enclosure diameters, increasing gas pressure does not appreciably increase insulation strength of the gas, when contamination particles are introduced into the housing during the assembly of the system. This puts an immediate limit on the practicality of working with small diameter, high dielectric strength systems since higher gas pressures would be needed, and it may not be possible to maintain the cleanliness levels necessary to take advantage of the increased insulation strength provided by the higher pressure.

BRIEF SUMMARY OF THE INVENTION

While it is difficult, if not impossible, to maintain high levels of cleanliness during field assembly, it is possible to maintain clean room conditions in the factory so that field assembly would become the limiting factor. In accordance with the present invention, field joint terminal regions of factory assembled sections are provided with relatively large diameters compared to the diameter of the major portion of the section length so that dielectric stresses within the field joint region are much lower and contamination of the gas will not assume the same significance that it would have in the factory assembled and clean small diameter bus regions. Note that the technique of forming enlarged termination regions can be applied to either rigid bus systems made in discrete lengths or flexible bus systems, where the bus factory assembled and wound on a reel.

In accordance with the invention, each shipping section is terminated in a large diameter insulator and is provided with a separate gas system from the main gas system in the small diameter region of the bus section. Thus, factory clean conditions are maintained in the small diameter part of the system. It is, however, possible, if desired, to place filter cartridges in the large diameter insulators to make possible the use of a single gas handling system for the entire bus.

In accordance with another feature of the invention, and to obtain optimum performance in the reduced field connection region, the diameter of the ends of the central conductor are also expanded. In particular, optimum performance can be obtained when the conductor diameter is expanded to about 1/2.72 times the diameter of the respective enlarged housing end.

Accordingly, a primary object of this invention is to improve the reliability of high voltage, gas-insulated bus by providing terminal regions on the bus which are pneumatically isolated from the small diameter, major length portions of the bus, so that the major length of the bus can be assembled under factory clean conditions.

A further object of this invention is to provide a novel bus termination arrangement having enlarged terminal regions for forming bus section connection regions which have a relatively low internal dielectric stress region.

BRIEF DESCRIPTION OF THE DRAWINGS

FIG. 4 is a plan view partially in cross-section of the terminal ends of two bus sections constructed in accordance with a second embodiment of the invention.

FIG. 5 is a cross-sectional view of one end of a bus section constructed in accordance with the invention, which is generally similar to the bus sections shown in the foregoing figures, where, however, the central conductor is expanded in diameter.

DETAILED DESCRIPTION OF THE DRAWINGS

Figure 1:
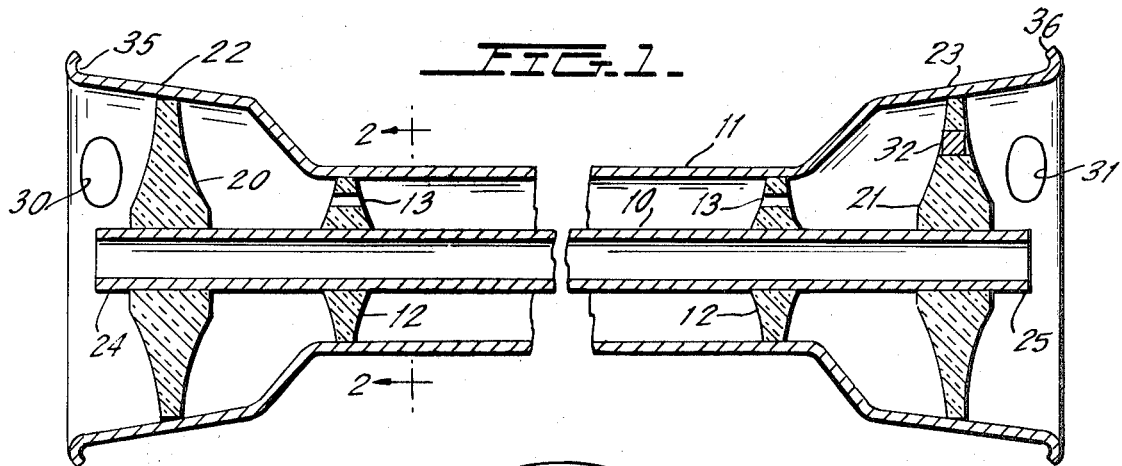
FIG. 1 is a cross-sectional view through the axis of one gas-insulated bus section which is constructed in accordance with the present invention.
Figure 2:
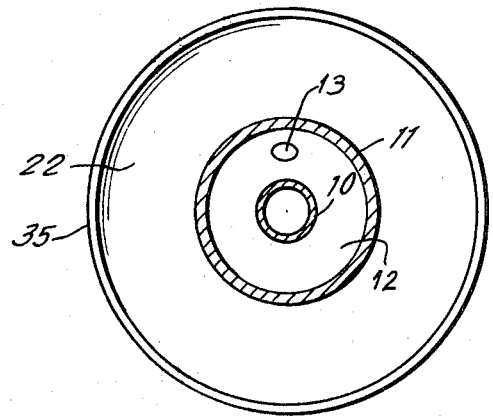
FIG. 2 is a cross-sectional view of FIG. 1 taken across the section line 2—2 in FIG. 1.

Referring first to FIGS. 1 and 2, there is illustrated therein, in cross-section, one embodiment of a unitary rigid bus length section manufactured in accordance with the present invention. Note, however, that the invention is also applicable to flexible bus which incorporates, for example, corrugated housing and conductors, or the like.

The bus section of FIGS. 1 and 2 consists of a central hollow bus conductor 10, typically of copper, which is supported within a metallic grounded housing 11 by a plurality of spaced insulator disks 12. The assembly of conductor 10, housing 11 and disks 12 is well known. The length of the bus section shown in FIGS. 1 and 2 may typically be about 40 feet, where the bus is assembled primarily in the factory, and where the interior of housing 10 may be charged with gas, such as sulfur hexafluoride, under positive pressure.

During assembly in the factory, relatively clean conditions can be observed to ensure against contamination particles being left in, and captured within the major length of the bus section. Note that the interior insulator disks 12 may have openings, such as openings 13, therein to allow the flow of compressed gas between the various compartments defined by the spaced disks 12. Any other desired form of gas passage can be provided between the compartments defined between the disk insulators 12.

The bus ends are then terminated by relatively large insulators 20 and 21, respectively. By way of example, insulators 12 may be 100 in number, spaced apart by 5 feet, and may have a diameter of 12 inches for a bus rated at 345 KV. Insulators 20 and 21 in this situation would have a diameter of about 20 inches.

The ends of the housing 10 are then outwardly flared at flare regions 22 and 23 to a diameter, for example, of 22 inches. The geometric shape of flared end regions 22 and 23 can be generally of any desired shape, it being desired to only increase the diameter of the housing ends. Typically, these end shapes can be semispherical and can be formed by preshaped sections which are welded to the ends of the aluminum housing 11. A spherical section of this general type is shown in U.S. Pat. No. 3,546,356 to Graybill et al, assigned to the assignee of the present invention, where, however, the enlarged spherical region connecting two adjoining bus sections is not pneumatically isolated from the remainder of a factory assembled bus section as in the present invention. Note further that the ends 24 and 25 of the bus 10 terminate slightly short of the plane of the housing ends to allow room for flexible connections to be made between the bus ends of adjacent sections.

Two handholes 30 and 31, which can be welded or sealed closed by appropriate caps after assembly of adjacent bus housings, are provided in the enlarged bus ends 22 and 23, respectively. Note that the insulator disks 20 and 21 form a gas seal at their respective bus end. Alternatively, and as shown in connection with disk 21, a filter cartridge 32 may be provided to enable the use of a single gas system for the entire bus, as will be later described. Note further that the outer ends of sections 22 and 23 are flared upwardly and reentrantly at regions 35 and 36, respectively, to provide a good seat for a weld bead.

Figure 3:
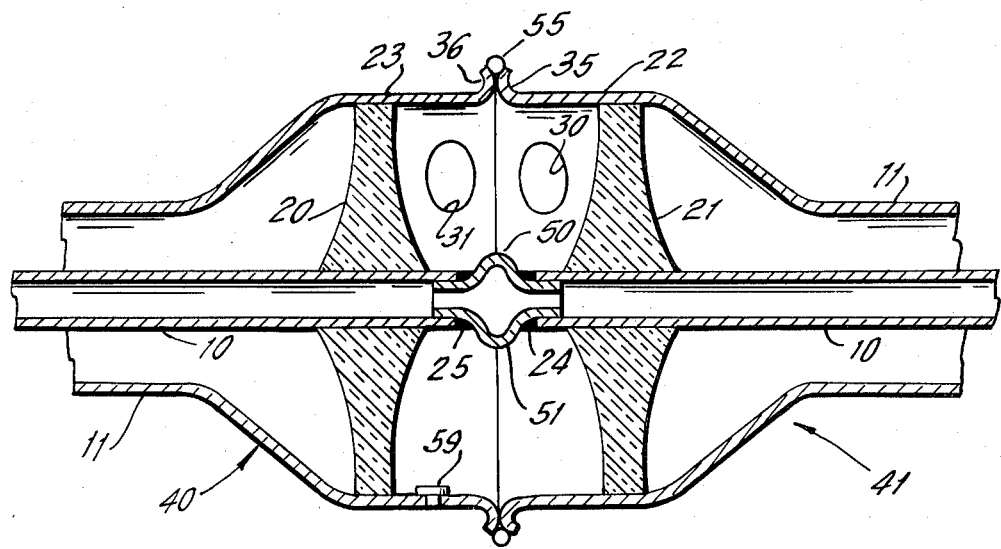
FIG. 3 is a cross-sectional view illustrating a welded connection between the terminal ends of two bus sections which are each constructed as shown in FIGS. 1 and 2.

FIG. 3 illustrates the manner in which two identical sections of the type shown in FIGS. 1 and 2 may be welded together in the field while permitting factory assembly of the major lengths of the sections. In FIG. 3, there are shown two sections 40 and 41 which are identical to the sections shown in FIGS. 1 and 2, with similar numerals in FIG. 3 identifying identical elements of FIGS. 1 and 2.

In order to connect the bus sections of FIG. 3 in the field, it is first necessary to connect the buses 10 to one another. A connector structure, similar to that shown in U.S. Pat. No. 3,573,341, can be used for this purpose. As shown in FIG. 3 for purposes of simplicity, the adjacent ends 24 and 25 of buses 10 are shown connected to one another by flexible shunts 50 and 51 which may be brazed to the ends 24 and 25 of buses 10. Note that this operation is performed through handholes 30 and 31 and that considerable contamination is created during this joining operation. This contamination, however, is confined to the volume between disk insulators 20 and 21 in FIG. 3 and does not contaminate the sealed interior of housings 11 which are factory assembled and cleaned to enable the use of a relatively small diameter housing for a relatively high voltage application. Thereafter, the ends of flared regions 22 and 23 are butted against one another and a circular weld 55 is formed between reentrantly shaped edge portions 35 and 36 in order solidly to weld the housing regions 22 and 23 together.

The chamber formed between disks 20 and 21 is then evacuated and cleaned and the handholes 30 and 31 are sealed closed. Therefore, and with further flushing and cleansing of the chamber, if desired, sulfur hexafluoride containing gas under pressure may be loaded into the joint volume through a valve schematically shown in FIG. 3 as valve 59. Note that even though the chamber between disk insulators 20 and 21 of FIG. 3 may not be as clean as the remainder of the bus which was factory assembled, that contamination products in the joint chamber is not a problem since the chamber has a relatively large diameter and, therefore, decreased voltage stresses exist within the chamber.

In FIG. 1 it was pointed out that the disk insulator 21 can have a filter cartridge 32 therein. When the cartridge is used in this manner, only a single gas system is needed for charging and maintaining gas pressure in the entire bus assembly. The provision of the filter cartridge 32 would prevent contamination particles, which can exist safely in the chamber between the two connected sections, from passing into a smaller diameter section of the bus.

FIG. 4 shows an embodiment of the invention where the connection process is simplified from that of FIG. 3. Thus, in FIG. 4, there are two bus sections 60 and 61 which are generally of similar construction to that shown in FIGS. 1 and 2, where, however, outwardly flared housing ends 22 and 23 are cylindrical in form and are covered by a cylindrical slidable metallic cover 62. Cover 62 may contain a filling valve 63 therein. The bus ends within the housings 11 are spaced from one another, with the ends of the housing sufficiently spaced so that the central bus bars 10 (not shown in FIG. 4) can be easily connected. The sliding cylinder 62 is preassembled onto one of the bus sections, so that, after the bus bars are connected together, the sliding cylinder 62 is slid into position, as shown in FIG. 4, and its outer ends are welded to sections 22 and 23 by the weld beads 70 and 71, respectively, after suitable cleansing within the chamber formed between insulator disks 20 and 21.

Referring next to FIG. 5, one end of a bus section constructed in accordance with the invention is shown, where the ends of the central conductor of the bus are also enlarged in diameter. Thus, in FIG. 5, there is shown an outer conductive housing 11 of the type generally shown in the foregoing figures, which has a conical section 100 connected at the end shown in FIG. 5 (as well as its opposite end), with the conical section 100 welded to an enlarged diameter cylindrical section 101, which is equivalent to enlarged diameter end 22 or 23 of the foregoing figures. The conventional insulation spacers 12 are also provided along with the enlarged spacer 21, similar to enlarged spacer 21 of FIGS. 1, 3 and 4.

In accordance with one aspect of the invention, and as shown in FIG. 5, the central conductor 10 is terminated with an enlarged diameter conductor secton 102 which is generally coextensive with the enlarged housing end portion 100–101. Note that the bus section 102 can be formed of a conical section 103 welded to the end of bus 10 at one end and welded to a short tubular section 104 at its other end. The section 104 terminates somewhat short of the end of housing section 101, to enable convenient use of bus connection hardware which is assembled between the ends of bus sections which are to be joined together.

The reason for exapanding the diameter of conductor 10 at its outer terminal end 102 can be seen from the equation which gives the electrical stress at a conductor surface:

$$E = \frac{V}{r_c \ln \frac{re}{rc}}$$

where

V = Voltage-to-ground $r_c$ = Conductor diameter re = Enclosure diameter

If the major portion of the system shown in FIG. 5 and the foregoing figures has a conductor diameter of 4.5 inches and an enclosure diameter of 12 inches, the conductor stress at normal operation voltage-to-ground (200 KV for a 345 KV system) is approximately 90 KV/inch. If the expanded housing portion 101 has a 20 inch diameter, the stress in this region, still assuming a 4.5 inch conductor, will be 60 KV/inch. However, if the conductor 104 is expanded to a 7.5 inch diameter, the stress is reduced still further to 53 KV/inch.

Since most contamination lies on the enclosure 101 until moved by the dielectric field, the stress at the enclosure is also of great interest. In the previously described 12 inch diameter section, the enclosure stress is 35 KV/inch (at 200 KV). In the 20 inch section 101 (with a 4.5 inch conductor) the enclosure stress is reduced to 13 KV/inch; this is a 60 percent reduction in stress and makes it much more difficult for particles to move. If the conductor is expanded to 7.5 inches diameter section 101, the enclosure stress increases to 20 KV/inch. This is still 43 percent lower than in the 12 inch section and the conductor stress has also been lowered by 40 percent.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A gas-insulated power transmission system for transmitting electric power at high voltage comprising a plurality of serially connected, substantially identical sections; each of said sections comprising an elongated conductive outer housing, a centrally disposed elongated conductor within said housing, and insulation support means for supporting said centrally disposed elongaed conductor relative to said outer housing; said elongated outer housing having a relatively constant diameter and having enlarged diameter end sections; and first and second end insulation disks disposed at either end of each of said end sections and forming a gas seal extending across the annular space between said central conductor and said outer housing, and being axially removed from the respective outer ends of said outer housing, whereby a sealed volume is formed around the junction between each of said sections which has a larger diameter than the diameter of the major portion of the length of said bus; a dielectric gas under pressure filling said outer housing and filling said sealed volume; and channel means extending into said sealed volume to enable the filling of said sealed volume with dielectric gas under pressure.

2. The system of claim 1 wherein said outer housings have a diameter of about 12 inches and wherein said enlarged diameter end sections have a diameter from about 1.5 to 3 times the diameter of said outer housings.

3. The system of claim 1 wherein said enlarged diameter end sections have an axial length of about 1 percent of the length of its corresponding section.

4. The system of claim 1 wherein said centrally disposed elongated conductor has enlarged diameter conductor end sections generally coextensive with said enlarged diameter end sections of said outer housing.

5. The system of claim 4 wherein said enlarged diameter conductor end sections have a diameter of about 1/2.72 times the enlarged end section diameter of said outer housing.

6. The system of claim 1 wherein said channel means comprises a channel extending through said first disk for allowing communication between the interior of said outer housing and said sealed volume.

7. The system of claim 6 wherein said channel means has a filter therein.

* * * * *